United States Patent [19]

McKenzie

[11] Patent Number: 4,533,707

[45] Date of Patent: Aug. 6, 1985

[54] SUPPORTED TRANSITION METAL COMPOSITION

[75] Inventor: Ian D. McKenzie, Welwyn Garden City, England

[73] Assignee: Imperial Chemical Industries, PLC, England

[21] Appl. No.: 621,462

[22] Filed: Jun. 18, 1984

Related U.S. Application Data

[62] Division of Ser. No. 405,984, Aug. 6, 1982, Pat. No. 4,465,782.

[30] Foreign Application Priority Data

Aug. 7, 1981 [GB] United Kingdom ............... 8124150

[51] Int. Cl.³ .............................................. C08F 4/44
[52] U.S. Cl. ...................................... 526/125; 526/159
[58] Field of Search ............................... 526/159, 125

[56] References Cited

U.S. PATENT DOCUMENTS

| | | | |
|---|---|---|---|
| 3,591,656 | 7/1971 | Kroll | 252/429 C X |
| 3,953,414 | 4/1976 | Galli et al. | 252/429 B X |
| 4,013,823 | 3/1977 | Longi et al. | 252/429 B X |
| 4,107,415 | 8/1978 | Giannini et al. | 252/429 B X |
| 4,111,835 | 9/1978 | Foschini et al. | 252/429 B X |
| 4,168,361 | 9/1979 | Oda et al. | 252/429 B X |
| 4,293,673 | 10/1981 | Hamer et al. | 252/429 B X |
| 4,376,062 | 3/1983 | Hamer et al. | 252/429 B |
| 4,460,700 | 7/1984 | Candlin et al. | 526/88 X |

FOREIGN PATENT DOCUMENTS

| | | |
|---|---|---|
| 1527736 | 10/1978 | United Kingdom . |
| 2006227 | 5/1979 | United Kingdom . |
| 1559194 | 1/1980 | United Kingdom . |
| 15048 | 1/1980 | United Kingdom . |

*Primary Examiner*—Paul R. Michl
*Assistant Examiner*—S. Babajko
*Attorney, Agent, or Firm*—Cushman, Darby & Cushman

[57] ABSTRACT

A supported transition metal composition is obtained by suspending a support material in an inert liquid medium, spraying the suspension, collecting a solid material and contacting the sprayed solid with a transition metal compound. The support material may be a metal halide such as magnesium chloride or an inorganic oxide such as silica or alumina. In addition to being contacted with the transition metal compound, the support material may be contacted either before or after the spraying step with other reagents such as organo metallic compounds, halogen compounds, or Lewis Base compounds. The product obtained after contacting with the transition metal compound may be used as a component of a polymerization catalyst system to polymerize an unsaturated monomer such as ethylene or propylene.

9 Claims, 2 Drawing Figures

SUPPORTED TRANSITION METAL COMPOSITION

This is a division of application Ser. No. 405,984 filed Aug. 6, 1982 now U.S. Pat. No. 4,465,782.

The present invention relates to processes for producing a supported transition metal composition, and also to the use of the supported transition metal compositions as a component of a polymerisation catalyst system and is further concerned with the polymerisation of unsaturated monomers, particularly olefin monomers such as ethylene and propylene, using such catalyst systems.

Since the original discovery of the so-called "Ziegler" polymerisation catalyst systems for polymerising olefin monomers such as ethylene and propylene, there have been considerable advances in the polymerisation of olefin monomers using these catalyst systems. Many of the advances have been related to developments in the catalyst systems and, in particular, to the use of catalyst systems in which the effective catalyst component is present on a support material. Using such catalyst systems, a high yield of polymer may be obtained relative to the transition metal component which is present in the polymerisation catalyst. However, the catalyst system obtained may be such that the polymer product is obtained as irregular particles having a wide particle size distribution. Such polymer particles will generally have a low packing density and in order to achieve maximum yield in a polymerisation vessel of a given size it is desirable that the polymer formed should have a high packing density. Accordingly, it is desirable to improve the form of the polymer obtained and, since this is influenced by the form of the catalyst particles, it is desirable to improve the form of the catalyst particles.

According to the present invention there is provided a process for the production of a supported transition metal composition wherein a solid support material is suspended in a liquid hydrocarbon or halohydrocarbon medium, the suspension is spray-dried, the spray-dried support material is collected and thereafter subjected to a stage in which it is contacted with at least one compound of a transition metal of Group IVA, VA, or VIA of the Periodic Table.

All references herein to the Periodic Table are to the Short Periodic Table as set out inside the back cover of "General and Inorganic Chemistry" by J. R. Partington, Second Edition, published by macMillian and Company Limited, London, 1954.

For convenience hereafter, the term "transition metal" will be used to mean a transition metal of Group IVA, VA or VIA of the Periodic Table.

The solid support material may be any support material which has been proposed hitherto for use as a support for a transition metal compound in a polymerisation catalyst, and in particular, it is preferred that the support material is an inorganic compound. Preferred support materials are metal halides, metal oxides or mixtures or reaction products of two or more such metal compounds. The term metal is used herein to include silicon. If the support material is a metal halide it is preferably a halide of a divalent metal, for example a magnesium halide. A metal halide support material is preferably chloride, in particular, manganese chloride or especially magnesium chloride. Suitable metal oxides which may be used include the oxides of the metals of Groups I to IV of the Periodic Table. Oxides which may be used are silica, alumina, magnesia and mixtures or reaction products of two or more thereof, for example, magnesium trisilicate which may be represented as $(MgO)_2(SiO_2)_3 \times H_2O$ (where x is a positive number).

The liquid medium in which the support material is suspended is preferably one which does not have a harmful effect on the supported transition metal composition which is obtained by contacting the spray-dried solid with the transition metal compound. Thus, a wide range of liquids may be used as the liquid medium provided that any residual quantities of the liquid which remain in the spray-dried support material are insufficient to have a harmful effect on the supported transition metal composition when this is used as a component of a polymerisation catalyst. In general, it is preferred that the liquid medium is an inert liquid. Thus, the liquid medium is preferably an aliphatic hydrocarbon such as hexane, heptane, octane, decane, dodecane or mixtures thereof or an aromatic hydrocarbon such as benzene, toluene or xylene or a halohydrocarbon such as chlorobenzene or 1,2-dichloroethane.

The relative proportions of the support material and the liquid medium should be such that a mobile suspension of the support material in the liquid medium is obtained. Thus, typically it is preferred to use the liquid medium in the proportions of at least 0.5 cm$^3$ for each gramme of the support material and, in particular, it is preferred to use at least one cm$^3$ of liquid for each gramme of solid material. In general, the amount of the liquid medium need not exceed 20 cm$^3$ for each gramme of solid material and satisfactory results can be achieved using from 2 up to 10 cm$^3$ of the liquid medium for each gramme of the solid support material.

It is preferred that, in addition to the support material and the liquid medium, there is also present in the suspension which is spray-dried, a small quantity of a material which either assists in the agglomeration of the particles of the support material or which gives a spray-dried solid having improved resistance to attrition. For convenience, this material will be referred to as an "attrition inhibitor". The attrition inhibitor is conveniently present as a solution in the liquid medium. The attrition inhibitor should be such that it does not have an appreciable adverse effect on the activity and/or stereospecificity of a polymerisation catalyst which is obtained from the supported transition metal composition which is formed using the spray-dried solid. If the spray-dried support material is subsequently suspended in a liquid medium, the attrition inhibitor preferably should be such as to at least minimise dispersion of the spray-dried support material into smaller particles in the presence of the liquid medium in which the support material is suspended. Hence, the attrition inhibitor is preferably soluble in the liquid medium used for the spray-drying step but is insoluble, or of low solubility in any liquid medium in which the solid is suspended after effecting the spray-drying step.

The attrition inhibitor may be for example polystyrene, polymethylmethacrylate, polyvinylacetate, atactic polypropylene or an AB block copolymer, for example, of t-butylstyrene/styrene. We have obtained useful results using polystyrene and polymethylmethacrylate as the attrition inhibitor. When the attrition inhibitor is polystyrene or polymethylmethacrylate, the liquid medium is preferably an aromatic liquid, for example, toluene. After the spray-drying stage, the spray-dried solid which contains polystyrene or polymethylmethacrylate as the attrition inhibitor is preferably not contacted with an aromatic liquid but rather is suspended in an aliphatic liquid medium. The amount of the attrition inhibitor is preferably from 0.5 up to 10% by weight relative to the support material and is conveniently from 0.5 up to 4% by weight relative to the support material.

Apparatus which may be used in the spray-drying step of the present invention is illustrated in the accompanying drawings, wherein.

The suspension of the support material in the liquid medium may be spray-dried using conventional spray-drying techniques. Thus, the suspension is passed through a suitable atomizer which creates a spray or dispersion of droplets of the suspension, a stream of hot gas is arranged to contact the droplets and cause evaporation of the liquid medium and the solid product which separates is collected. Suitable atomizers for producing droplets of the suspension include nozzle atomizers and spinning disc atomizers. The gas which contacts the droplets may be any suitable gas and is preferably a gas which does not react with the support material under the conditions of spray-drying. It is generally preferred to use an oxygen-and water-free gaseous medium in order to avoid the presence of undesirable materials in the spray-dried product. However, spray-drying of the support may be effected in dry air or dry oxygen provided there is no reaction between oxygen and the support material under the conditions used for the spray-drying. A suitable gaseous medium for effecting spray-drying is nitrogen having a high degree of purity, but any other gaseous medium may be used, particularly one which will have no deleterious effect on the supported transition metal composition which is the final product of the present invention. Alternative gaseous materials which may be used include hydrogen and the inert gases such as argon or helium.

If it is desired to prevent the ingress of oxygen- or particularly water vapour-containing materials into the spray-drying apparatus, it is preferred to operate at a slightly elevated pressure, for example, at about 1.2 kg/cm$^2$ absolute. Although the temperature may be below the boiling temperature of the liquid medium under the pressure conditions which exist within the spray-drying apparatus, the temperature should be such as to cause sufficient evaporation of the liquid medium to dry at least the outer surface of the droplet before they reach the wall, or discharge point, of the spray-drying apparatus.

The temperature of the spray-drying may be any desired temperature provided this does not have any undue effect on the nature of the solid support material. In general, it is preferred that the temperature of the hot gas introduced into the spray-drying apparatus does not exceed about 200° C. It is also preferred that the temperature of the droplets, or of the spray-drying material obtained, does not exceed about 200° C. and preferably does not exceed about 150° C. To achieve sufficient evaporation of the liquid medium in the droplets, it is preferred that the temperature of the gas is at least 80° C. In general, the spray-drying will be effected by using a suspension at ambient temperature to produce the spray and evaporating the liquid from the spray by means of a hot gas which is introduced into the spray-drying apparatus.

The hot gas may be arranged to pass either in a counter-current flow relative to the droplets of the mixture or may be arranged to pass in a concurrent flow relative to the droplets of the mixture. Using a cocurrent flow, the atomizer is typically located at the top of the spray-drying apparatus and the hot gas is introduced into the top of the apparatus and is removed from near the bottom of the apparatus. With a countercurrent flow, the atomizer is typically located at the bottom of the spray-drying apparatus and arranged to spray upwardly against a current of hot gas introduced into the top of the apparatus.

Some of the spray-dried solid collects at the bottom of the apparatus, from which it may be removed, preferably continuously, by suitable means such as a star feeder valve, a screw conveyor, or in the hot gas stream.

The hot gas, which has been cooled by its passage through the spray-drying apparatus may be removed separately from the spray-drying apparatus. The hot gas may be passed through a cyclone to remove entrained solid, and the solid removed in the cyclone may be added to any which is separately removed from the spray-drying apparatus. The vapour of the liquid medium which is present in the hot gas is desirably condensed in a suitable condenser, and the condensed liquid medium can be re-used for mixing with the solid material and subsequent grinding. The gas may then be re-heated and recirculated to the spray-drying apparatus.

The conditions of spray-drying can be adjusted to give any desired particle size and it is preferred that essentially all, that is at least 90%, of the particles of the final spray-dried material are in the range from 5 up to 100 microns, particularly between 10 and 80 microns, for example having a mean size of about 30 microns.

Since the spray-dried solid material is subsequently contacted with at least one compound of a transition metal to give a product which can be used as a component of a polymerisation catalyst, it is desirable that the form of the spray-dried solid material should be such that the polymer obtained has a satisfactory particle form.

After effecting the spray-drying step, the spray-dried support material is contacted in a subsequent stage with a transition metal compound to form a supported transition metal composition. The treatment with the transition metal compound may be effected directly after the spray-drying stage or other intermediate treatment stages may be carried out prior to effecting the treatment with a transition metal compound.

The transition metal compound is one in which the transition metal may be for example vanadium or zirconium and is preferably titanium. Preferred transition metal compounds are the halides or oxyhalides, for example, vanadium tetrachloride, vanadium oxytrichloride, zirconium tetrachloride and especially preferred are the titanium halides, in particular, titanium tetrachloride. More than one compound of a transition metal may be used such as a mixture of titanium halide and vanadium halide, for example, a mixture of vanadium tetrachloride and titanium tetrachloride. If more than one transition metal compound is used, the treatment with the transition metal compound may be effected in more than one stage or all of the transition metal compounds may be used in a single stage. The particular transition metal compounds which are contacted with the spray-dried support material will be dependent on the intended use of the supported transition metal composition. The supported transition metal compositions obtained by the process of the present invention are suitable for use as components of polymerisation catalyst, particularly for the polymerisation of olefin monomers and, if the system is to be used for the polymerisation of the higher olefin monomers, it is preferred that the transition metal compound is titanium tetrachloride. However, if the supported transition metal composition is to be used for the production of an ethylene polymer in which the major component is ethylene, then a mixture of transition metal compounds may be used in order to achieve variations in the molecular weight distribution of the final polymer. However, for the polymerisation of ethylene, satisfactory results have been achieved using titanium tetrachloride as the transition metal compound.

The treatment with the transition metal compound is conveniently effected by suspending the spray-dried support material in a liquid medium which is, or which contains, the transition metal compound. A number of transition metal compounds are liquids, for example, titanium tetrachloride, and using such liquid transition metal compounds the spray-dried support material is conveniently suspended in the undiluted liquid transition metal compound. It will be appreciated that if the spray-dried support material is suspended in a liquid transition metal compound, there will be a substantial excess of the transition metal compound relative to the support material. Alternatively, the spray-dried support material may be suspended in a liquid medium which comprises a solution of the transition metal compound in a suitable solvent. If the spray-dried support material is suspended in a solution of the transition metal compound, the proportion of the transition metal compound to the solid material may be varied from about 0.1 millimoles of the transition metal compound for each gramme of the solid material up to a substantial excess, that is, more than one mole per mole, of the transition metal compound relative to the solid support material. The procedure used will depend on the way in which the supported transition metal composition is to be used but, in general, we prefer to carry out this stage by suspending the spray-dried solid material in a liquid transition metal compound.

The treatment of the spray-dried support material with the transition metal compound is preferably effected at an elevated temperature and, in particular, at a temperature of at least 60° C. The treatment may be effected at any temperature up to the boiling temperature of the liquid medium in which the solid is suspended and thus temperatures of up to 200° C. may be used. If the solid is suspended in the liquid transition metal compound this may be effected at a temperature of up to the reflux temperature of the transition metal compound, and when titanium tetrachloride is used this temperature is about 137° C. In general, however, a temperature of from about 80° C. up to 120° C. is suitable.

Some transition metal compounds which may be contacted with the spray-dried support material may be compounds having a reduced stability at elevated temperature. If such a compound is used it will be appreciated that contacting of this compound with the spray-dried support material should be effected at a low temperature so that there is no substantial deterioration or decomposition of the transition metal compound.

It will also be appreciated that if desired the spray-dried solid may be contacted as a dry solid with a gaseous stream containing the vapour of the transition metal compound and such a treatment may be effected at a temperature in the range previously indicated for treatments with a liquid medium containing the transition metal compound.

The treatment of the spray-dried solid material with the transition metal compound is effected for a period of time which is sufficient to allow a desired extent of reaction between the transition metaa compound and the support. In general, it is sufficient to allow the transition metal compound to remain in contact with the spray-dried support material for a period of from 5 minutes up to 20 hours and typically from 1 up to 5 hours.

The spray-dried support material may be subjected to more than one treatment with the transition metal compound, and such treatments may be effected using the same or a different transition metal compound. A procedure in which a support material is treated in two stages with the same transition metal compound is described in our British Pat. Specification No. 2,103,627A entitled "Transition Metal Composition, Production and Use".

After the treatment with the transition metal compound, depending on the relative proportions of transition metal compound and spray-dried support material which are used, the supported transition metal composition may be separated from the liquid medium and optionally washed several times to remove at least some unreacted transition compound from the supported transition metal composition. The supported transition metal composition may be finally suspended in a suitable liquid medium or may be obtained as a dry solid.

In addition to the stages hereinbefore described, the production of the supported transition metal composition may involve additional stages. Thus, a solid material which is the support material, the spray-dried support material or the transition metal composition, may be treated with one or more other reagents. The other reagents which may be used in the additional stages include organo-metallic compounds, halogen-containing compounds, and/or Lewis Base compounds. The nature of the other reagents used will depend on the nature of the final supported transition metal composition which is desired and, in particular, the use for which the supported transition metal composition is intended.

If the support material is an inorganic oxide such as silica or alumina, this may be used to produce a catalyst system of the type described in European Patent Applications Publication Numbers 14523 and 14524. In the procedure of the foregoing European Patent Applications, a support material is treated with an organic magnesium compound, optionally with a halogen-containing compound, and with a Lewis Base compound and also with a transition metal compound. Thus, the process of the present invention may include a treatment of the support material, before or after the spray-drying stage, with an organic magnesium compound, a chlorine-containing compound and a Lewis Base compound, such treatments being in addition to the treatment with the transition metal compound which is effected after the spray-drying state. Thus, it will be appreciated that the spray-drying of the support material and subsequent treatment thereof with a transition metal compound may be used as a part of the procedure described in European Patent Applications Publication Numbers 14523 and 14524.

Alternatively, the spray-drying process of the present invention may be used as part of the procedure described in European Patent Application Publication Number 15048. According to European Patent Application Publication Number 15048, a magnesium hydrocarbyl compound is reacted with a halogenating agent, the halogenated product is treated with a Lewis Base compound and this treated product is contacted with titanium tetrachloride. Either of the intermediate products can be spray-dried in accordance with the present invention and thereafter subjected to the subsequent stages, including the treatment with titanium tetrachloride.

Particularly useful catalyst systems for the polymerization of propylene in high yield to give a polymer of high stereospecificity may be obtained using a magnesium halide such as magnesium chloride as a support material. Preferred catalyst systems of this type also include a Lewis Base component. In the process of the present invention the Lewis Base compound ay be contacted with the support material before or after the latter has been subjected to the spray-drying stage. Useful catalysts are obtained by co-grinding the magnesium halide with a Lewis Base compound. It will be appreciated that, if the support material is ground with a Lewis Base compound, such a grinding stage should be effected before the spray-drying stage is effected. Alternatively, the support material may be contacted with the Lewis Base compound without carrying out a grinding stage. It will be appreciated that such a procedure is particularly useful if the spray-dried support material is contacted with the Lewis Base compound.

Thus, as a particular preferred embodiment of the present invention, a support material which is magnesium chloride is suspended in a liquid medium, the suspension is spray-dried, spray-dried magnesium chloride is collected and thereafter treated with liquid undiluted titanium tetrachloride at a temperature of at least 60° C. wherein before or after effecting the spray-drying stage and before contacting the spray-dried support material with the liquid titanium tetrachloride, the support material is contacted with a Lewis Base compound.

Treatment with a Lewis Base compound is a preferred additional stage in the process of the present invention. Any Lewis Base compound, especially an organic Lewis Base compound, which has been previously proposed for use in an olefin polymerisation catalyst system may be used. Thus, the Lewis Base compound may be an ether, an ester, a ketone, an alcohol, an orthoester, a sulphide (a thioether), an ester of a thiocarboxylic acid (a thioester), a thioketone, a thiol, a sulphone, a sulphonamide, a fused ring compound containing a heterocyclic sulphur atom, an organic silicon compound such as a silane or a siloxane, an amide such as formamide, urea and substituted derivatives thereof such as tetramethyl urea, thiourea, an alkanolmine, an amine, which term includes a cyclic amine, a diamine, or a polyamine, for example, pyridine, quinoline, or tetramethylethylenediamine, or an organic phosphorous compound such as an organic phosphine, an organic phosphine oxide, an organic phosphite or an organic phosphate. The use of organic Lewis Base compounds is disclosed, inter alia, in British Patent Specifications Nos. 803 198, 809 717, 880 998, 896 509, 920 118, 921 954, 933 236, 940 125, 966 025, 969 074, 971 248, 1 013 363, 1 017 977, 1 049 723, 1 122 010, 1 150 850, 1 208 815, 1 234,657, 1 324 173, 1 359,328, 1 383 207, 1 387 890, 1 423 658, 1 423 659, 1 423 660, 1 495 031, 1 527 736, 1 554 574 and 1 559 194.

Lewis Bases which have been disclosed as being particularly useful in polymerisation catalyst components particularly supported transition metal compositions include esters and organic silicon compounds. The esters may be the esters of saturated or unsaturated carboxylic acids, for example, ethyl acetate or methyl methacrylate, but we particularly prefer to use the esters of carboxylic acids which contain an aromatic group such as, for example, ethylbenzoate, butylbenzoate, methyl p-methylbenzoate, ethyl p-methoxybenzoate and ethyl phenylacetate. Other esters which may be used are the mono- and poly-esters of saturated and unsaturated polycarboxylic acids (which term includes dicarboxylic acids) such as dialkyl phthalates. Organic silicon compounds can be compounds containing one or more Si—OR, Si—OCOR or Si—NR$_2$ bonds, where R is a hydrocarbyl group, and include phenyltriethoxysilane, diphenyldiisobutoxysilane and isobutyl-triethyoxysilane.

The treatment of the support material with the Lewis Base compound may be effected by grinding, for example, as disclosed in British Patent Specifications Nos. 1 527 736 and 1 559 194. Alternatively, the support material, which may optionally have been subjected to other treatments, may be treated either before or after the spray-drying stage by contacting with the Lewis Base compound in the absence of milling, for example, as described in British Patent Specification No. 1 271 411 and European Patent Applications Publication Numbers 14523, 14524 and 15048.

The process of the present invention may be included in the process of our British Patent Specification No. 2,103,627A entitled "Transition Metal Composition, Production and Use". In the process of our said copending application, a composition of a magnesium halide and an ester of a carboxylic acid is formed, typically by cogrinding the magnesium halide and the ester, the composition is contacted with hot titanium tetrachloride, the contacting with hot titanium tetrachloride is repeated and thereafter the product obtained is subjected to a mild washing procedure which is sufficient to remove only a part of the soluble titanium species from the product. The preferred transition metal composition is obtained by cogrinding magnesium chloride with ethyl benzoate, suspending the coground product in titanium tetrachloride at a temperature of at least 60° C., separating the solid from the titanium tetrachloride, repeating the treatment with the titanium tetrachloride and washing the product obtained not more than twice with heptane at a temperature of at least 60° C. In the titanium chloride composition thus obtained, a substantial proportion, which may be more than 50% of the titanium, may be capable of being extracted by continued washing with hot heptane.

Alternatively, the process of the present invention may be included in the process of our copending patent application Serial No. 444,364 entitled "Composition Production and Use". In accordance with copending patent application Serial No. 444,364 a titanium-containing composition is obtained by contacting a magnesium halide with at least one compound of a non-metallic element, other than oxygen, of Group IV to VI of the Periodic Table, and contacting the product obtained with a liquid phase containing titanium tetrachloride, where the compound of the non-metallic element also contains oxygen and halogen, there being one or two atoms of oxygen for each molecule and sufficient halogen to satisfy the residual valencies of the non-metallic element which may be carbon, phosphorus or sulphur. It is preferred that the magnesium halide material is also contacted with a Lewis Base compound, for example an ester such as ethyl benzoate. The compound of the non-metallic element will hereafter be referred to as the "non-metallic halide" and is typically thionyl chloride ($SOCl_2$). In accordance with the preferred procedure of copending patent application Serial No. 444,364 the magnesium halide is ground with thionyl chloride and an ester such as ethyl benzoate, subsequently suspended at least once in undiluted titanium tetrachloride at a temperature of at least 60° C. and washed at least once with an inert hydrocarbon such as heptane at a temperature of at least 60° C. The spray-drying procedure of the present invention may be incorporated into the procedure of copending patent application Serial No. 444,364 at any stage before the stage in which the magnesium halide is suspended in titanium tetrachloride.

The solid support material may be spray-dried without being subjected to any preliminary treatment other than possibly being milled with a Lewis Base compound and/or a non-metallic halide. However, the particle size, and particle size distribution, of the solid support material may be such that the solid support material does not readily spray dry or does not give a spray dried product having a satisfactory particle form. Thus, it may be necessary to treat the solid support material to improve its particle form and/or size. The solid support material may be treated by the process described in our copending application Serial No. 405,493, entitled "Spraying Solid". According to the process of our said copending application, a solid material, which may be a solid support material, is mixed with a liquid medium and the mixture is subjected to mechanical action to cause a reduction in the particle size of the solid material, and the resulting material is spray dried. The mechanical action can be such as to subject a suspension of the support material in the liquid medium to simultaneous vigorous agitation and a shearing action. Alternatively, the mechanical action can be achieved by grinding the mixture of the solid support material and the liquid medium. The procedures of our said copending application may be used as a preliminary stage in the process of the present invention, as described in more detail in the Examples.

The supported transition metal composition obtained by the process of the present invention, including the additional treatment stages noted herein, may be used together with an organic compound of a non-transition metal to give a polymerisation catalyst system.

Thus, as a further aspect of the present invention, there is provided a polymerisation catalyst system which is the product obtained by mixing together
(1) a supported transition metal composition obtained by the process hereinbefore described; and
(2) an organic compound of a non-transition metal of Groups I to IV of the Periodic Table.

Component 2 of the catalyst may be an organo-metallic derivative of a metal of Groups IA, IIA, IIB, IIIB, or IVB of the Periodic Table. The organo-metallic compound is typically an organic compound of aluminium or of a metal of Group IIA of the Periodic Table or a complex of an organic compound of a metal of Group IA or IIA of the Periodic Table together with an organic aluminium compound. Thus, Component 2 of the catalyst system may be an organic magnesium compound such as, for example, a dihydrocarbyl magnesium compound, a hydrocarbyl magnesium halide compound or an alkoxy magnesium compound, preferably one containing an alkyl group in addition to an alkoxy group. Alternatively, a complex of a magnesium compound with an aluminium compound may be used, for example, a complex of a magnesium alkyl with an aluminium alkyl.

Component 2 may be a complex of a metal of Group IA with an organic aluminium compound, for example, a compound of the type lithium aluminium tetraalkyl.

Preferably Component 2 is an organic aluminium compound which may be, for example, an aluminium hydrocarbyl sulphate, or an aluminium hydrocarbyl hydrocarbyloxy or, more preferably, an aluminium hydrocarbyl halide such as a dihydrocarbyl aluminium halide or particularly preferred are aluminium trihydrocarbyl compounds or dihydrocarbyl aluminium hydrides. The especially preferred aluminium compounds are aluminium trialkyls particularly those in which the alkyl group contains from 2 up to 10 carbon atoms, for example, aluminium triethyl, aluminium tri-isobutyl and aluminium trioctyl.

The catalyst system may consist of only two components, particularly if the monomer being polymerised is ethylene or contains a substantial proportion of ethylene, for example, sufficient to give a polymer containing at least 70% by weight of ethylene. However, if Component 2 of the catalyst system is an aluminium trihydrocarbyl compound, and the catalyst system is to be used to polymerise a higher olefin monomer such as propylene, it is preferred that the catalyst system also includes a Lewis Base compound. The Lewis Base compound which may be used as a further component of the catalyst system can be any Lewis Base compound of the type disclosed herein as being suitable for use in the production of a transition metal composition in accordance with the present invention.

Particularly preferred Lewis Base compounds for use as a further component of the catalyst system are esters and organic silicon compounds such as the esters of carboxylic acids which contain an aromatic group such as, for example, ethyl benzoate, butyl benzoate, methyl p-methylbenzoate, ethyl p-methoxybenzoate, and ethyl phenylacetate, and also dialkyl phthalates and phenyl alkoxysilanes.

In addition to, or instead of, the Lewis Base compound which may be present as a further component of the catalyst system, there may also be present in the catalyst system a substituted or unsubstituted polyene, which may be an acyclic polyene such as 3-methylheptatriene (1,4,6), or a cyclic polyene such as cyclooctatriene, cyclooctatetraene, or cycloheptatriene, or the alkyl- or alkoxy-substituted derivatives of such cyclic polyenes, or the the tropylium salts or complexes, or tropolone or tropone.

The proportions of Components 1 and 2 of the catalyst system can be varied within a wide range as is well known to the skilled worker. The particular preferred proportions will be dependent on the type of materials used and the absolute concentrations of the components but, in general, we prefer that for each gramme atom of the transition metal which is present in Component 1 of the catalyst system there is present at least one mole of Component 2. The number of moles of Component 2 for each gramme atom of the transition metal in Component 1 may be as high as 1000 but conveniently does not exceed 500 and with some transition metal compositions may be not more than 25, for example, from 5 up to 10.

When catalyst system includes Lewis Base component as a further component of the catalyst system, it is preferred that this Lewis Base compound is present in an amount of not more than 1 mole for each mole of Component 2 and particularly in an amount of from 0.1 up to 0.5 moles of the Lewis Base compound for each mole of Component 2. However, depending on the particular organic metal compound and Lewis Base compound, the proportion of the Lewis Base compound may need to be varied in order to achieve the optimum catalyst system.

If the catalyst system includes a polyene, it is preferred that the polyene is present in an amount of not more than 1 mole for each mole of Component 2, and especially from 0.01 up to 0.20 moles for each mole of Component 2. If the catalyst system includes both the Lewis Base component and the polyene, it is preferred that both of these materials are present together in an amount of not more than 1 mole for each mole of Component 2.

Catalyst systems in accordance with the present invention are suitable for the polymerisation and copolymerisation of unsaturated monomers, particularly ethylenically unsaturated hydrocarbon monomers such as the olefine monomers.

Thus, as a further aspect of the present invention, there is provided a process for the production of a polymer or copolymer of an unsaturated monomer wherein at least one ethylenically unsaturated hydrocarbon monomer is contacted under polymerisation conditions with a polymerisation catalyst as hereinbefore defined.

The monomer which may be contacted with the catalyst system is conveniently one having the following formula:

$$CH_2=CHR^1$$

wherein $R^1$ is a hydrogen atom or a hydrocarbon radical.

Thus, the monomer may be ethylene, propylene, butene-1, pentene-1, hexene-1, 4-methylpentene-1, styrene, 1,3-butadiene or any other monomer which satisfies the foregoing formula. The monomer is preferably an olefin monomer, particularly an aliphatic mono-olefin monomer containing not more than 10 carbon atoms.

The monomers may be homopolymerised or may be copolymerised together. If propylene is copolymerised it is preferred to effect the copolymerisation with ethylene, conveniently using a sequential copolymerisation process as is described in British Patent Specifications Nos. 970 478; 970 479 and 1 014 944. If ethylene is being copolymerised using the process of the present invention, it is preferred to carry out the copolymerisation using a mixture of ethylene and the desired comonomer, for example butene-1 or hexene-1, wherein the mixture of monomers has essentially the same composition throughout the polymerisation process.

Component (1) of the catalyst may be mixed with the other component, or components, of the catalyst in the presence of the olefin monomer. If the catalyst includes a Lewis Base compound, it is preferred to premix the organic metaa compound which is component (2) with the Lewis Base compound and then to mix this pre-mixture with the reaction product which is component (1).

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Patent Specifications Nos. 1 111 493; 1 226 659 and 1 383 611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase may be effected using conditions which are such that the monomer is at a temperature and partial pressure which are close to the dew point temperature and pressure for that monomer, for example as described in more detail in British Patent Specification No. 1 532 445. Polymerisation in gas phase can be effected using any technique suitable for effecting a gas-solid reaction such as a fluidised-bed reactor system, a stirred-bed reactor system or a ribbon blender type of reactor.

Using the catalyst systems of the present invention, ethylene may be polymerised or copolymerised, for example with butene-1 as the comonomer, in a fluidised-bed reactor system to give a high yield of polymer. The fluidising gas is the gas mixture to be polymerised together with any hydrogen which is present as a chain transfer agent to control molecular weight. Thus, for the copolymerisation of ethylene and butene-1 to produce an ethylene copolymer having a density of less than about 940 kg/m$^3$, the gas composition is typically from 50 to 60 mole % ethylene, 15 to 25 mole % butene-1 with the remainder, apart from inert materials and impurities, being hydrogen.

Polymerisation may be effected either in a batch manner or on a continuous basis, and the catalyst components may be introduced into the polymerisation vessel separately or all the catalyst components may be mixed together before being introduced into the polymerisation reactor. If all of the catalyst components are pre-mixed, this pre-mixing is preferably effected in the presence of a monomer and such pre-mixing will result in at least some polymerisation of this monomer before the catalyst system is introduced into the polymerisation vessel. If the polymerisation is being carried out in the gas phase, the catalyst components may be added to the polymerisation reactor suspended in a stream of the gaseous monomer or monomer mixture.

The polymerisation can be effected in the presence of a chain transfer agent such as hydrogen or a zinc dialkyl, in order to control the molecular weight of the product formed. If hydrogen is used as the chain transfer agent in the polymerisation of propylene, it is conveniently used in an amount of from 0.01 up to 5.0%, particularly from 0.05 up to 2.0% molar relative to the monomer. When the monomer being polymerised is ethylene, or a mixture in which ethylene is a major polymerisable component (by moles), the amount of hydrogen used may be greater, for example, in the homopolymerisation of ethylene the reaction mixture may contain in excess of 50% molar of hydrogen, whereas if ethylene is being copolymerised, a proportion of hydrogen which is typically up to 35% molar is used. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° C. up to 85° C.

Polymerisation can be effected at any pressure which has been previously proposed for effecting the polymerisation of monomers such as olefin monomers. However, although the polymerisation may be effected at pressures up to 3000 kg/cm$^2$, at which pressures the polymerisation temperature may be as high as 300° C., it is preferred to carry out the polymerisation at relatively low pressures and temperatures. Whilst the polymerisation may be effected at atmospheric pressure, it is preferred to use a slightly elevated pressure and thus it is preferred that the polymerisation is effected at a pressure of from 1 kg/cm$^2$ up to 50 kg/cm$^2$, preferably from 5 up to 30 kg/cm$^2$. The polymerisation temperature is preferably above ambient temperature and typically will not exceed 100° C.

Figure 1:
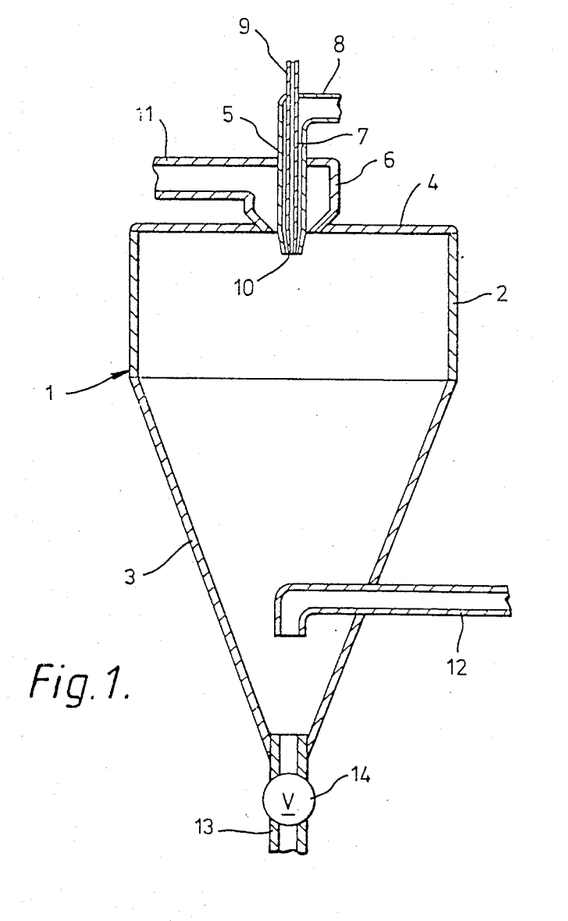
- in FIG. 1 there is given a cross-sectional elevation of a spray-drying apparatus having an atomising nozzle; and in FIG. 2 there is given a cross-sectional elevation of an alternative spray-drying apparatus having a spinning disc atomizer.

Referring to FIG. 1 of the accompanying drawings, a gas-tight spray-drying vessel 1 comprises an upper cylindrical section 2 and a lower, generally conical section 3. The upper section 2 is provided with a cover plate 4.

An atomizer nozzle assembly 5 is located within a plenum chamber 6, the plenum chamber 6 being mounted on the cover plate 4. The atomizer nozzle assembly 5 contains an inner conduit 7 and an outer conduit 8. The conduit 7 is a continuation of a conduit 9, which is connected to a source (not shown) of a suspension containing, for example, a ground mixture of a solid support material and a liquid medium. Conduit 8 is connected to a source (not shown) of an inert gas. The conduits 7 and 8 are essentially co-axial and are tapered at their lower ends. The nozzle assembly 5 is provided at its lower end with an orifice 10 formed by openings in both of conduits 7 and 8. A conduit 11 is connected to the plenum chamber 6 and also to a source (not shown) of a heated inert gas.

Near the bottom of the vessel 1 is located a conduit 12 which passes out of the vessel 1 through the side of the conical section 3. A conduit 13, in which is located a valve means 14, is connected to the bottom of the conical section 3 and is also connected to a hopper (not shown) for storing dry solid.

In operation, the gas flow through the conduit 8 draws the suspension through the conduits 9 and 7. The gas and the suspension pass through the orifice 10 and form a spray of droplets. Hot inert gas which passes through conduit 11 and plenum chamber 6 flows past the orifice 10 and causes evaporation of the liquid medium from the droplets of the suspension. The inert gas containing the vaporised liquid medium and some entrained spray-dried solid, passes out of the vessel 1 through the conduit 12. The major portion of the spray-dried solid collects at the bottom of the conical section 3 from which it is withdrawn through the conduit 13 by operation of the valve means 14.

The inert gas passed through the conduit 11 is conveniently nitrogen at a temperature in the range 130° to 150° C.

Figure 2:
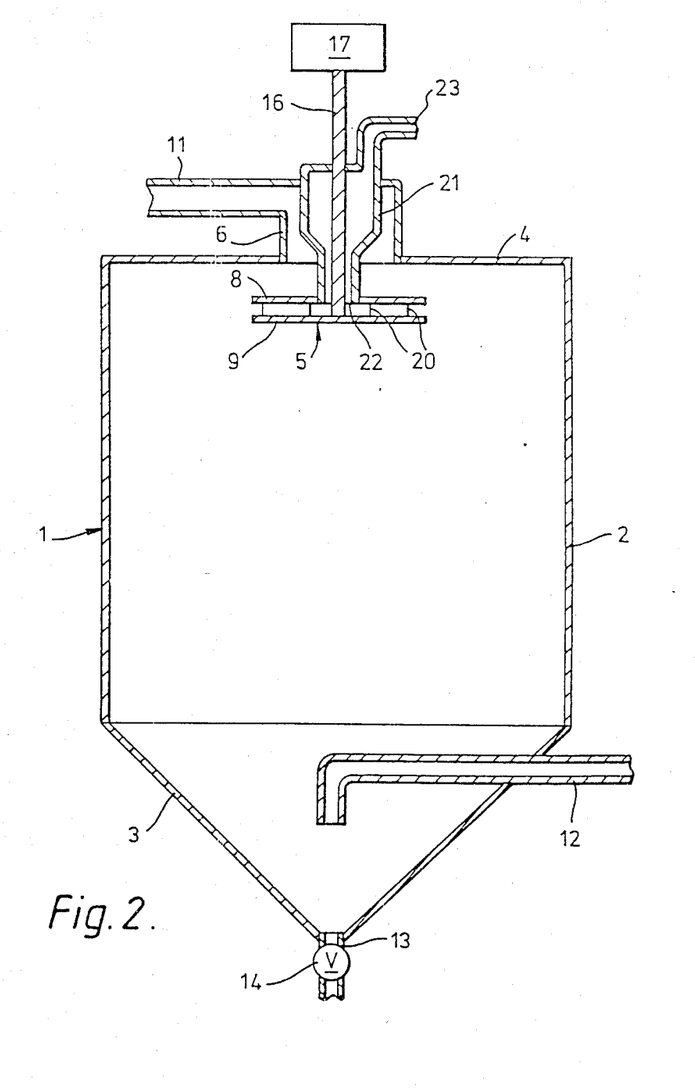

The apparatus shown in FIG. 2 is essentially the same as that shown in FIG. 1 with the exception that the atomizer nozzle is replaced by a disc atomizer. In FIG. 2, the corresponding parts are indicated by the same reference numbers as in FIG. 1.

A disc atomizer 15 mounted on the end of an output shaft 16 of a high speed gear box/motor assembly 17 is located near the top of the vessel 1. The disc 15 consists of two plates 18 and 19 between which are secured a series of radial vanes 20. A chamber 21 surrounds the drive shaft 16 and extends to the upper plate 18 of the disc 15. The plate 18 is provided with a central opening indicated at 22.

The plenum chamber 6 surrounds the chamber 21. A conduit 23 is connected to the chamber 21 and also to a source (not shown) of a suspension containing a solid material.

In operation, the disc 15 is rotated at a high speed in the range from 500 up to 25,000 rpm. A suspension which is a mixture of a solid support material and an inert liquid medium, for example a magnesium chloride-ethyl benzoate product in toluene, is passed through the conduit 23 and chamber 21 into the space between the plates 18 and 19 of the disc 15. The high speed of rotation of the disc 15, and the vanes 20, cause the suspension to pass to the periphery of the disc 15 from which the suspension is flung off as a spray of droplets.

A hot inert gas, for example nitrogen in the range 130° C. to 150° C., is passed through the conduit 11, and plenum chamber 6 to flow round the rotating disc 15. The hot inert gas causes evaporation of the liquid medium from the droplets of the suspension.

The inert gas containing the vaporised liquid medium and some entrained spray-dried solid, passes out of the vessel 1 through the conduit 12. The major portion of the spray-dried solid collects at the bottom of the conical section 3 from which it is withdrawn through the conduit 13 by operation of the valve means 14.

The inert gas passing through the conduit 12 may be passed to a cyclone (not shown) to recover entrained solid, then to a condenser (not shown) to recover the liquid vapour and finally to a re-heater (not shown). The reheated inert gas is then recirculated to the conduit 11. The spray-dried solid passing through the conduit 13 is passed to a storage hopper (not shown).

Other alternative arrangements and spray-drying techniques will be apparent to the skilled worker and may be used without departing from the scope of the present invention as defined herein.

Various aspects of the present invention will now be described with reference to the following Examples which are illustrative of the invention. In the Examples, all operations are effected under an atmosphere of nitrogen unless otherwise indicated. All the glass apparatus was dried in an air oven at 120° C. for at least one hour and purged with nitrogen before use.

Examples 1 to 6 illustrate spray-drying a solid support material and contacting the spray-dried solid with a transition metal compound, in accordance with the present invention, and the incorporation of this procedure into the preparation of a transition metal composition carried out in accordance with our British Patent Specification No. 2,103,627A entitled "Transition Metal Composition, Production and Use". In Examples 1 to 6, the solid support material was subjected to a mechanical action as described in our copending application Ser. No. 405,983 entitled "Spraying Solid".

EXAMPLE 1

(A) Milling magnesium chloride and ethyl benzoate

A Siebtechnik SM10 Vibromill having a total volume of about 38 dm³ and containing 119 kg of stainless steel balls of 25 mm diameter was sealed, and purged with nitrogen to give a nitrogen atmosphere in the mill. A mixture of water and ethylene glycol at 0° C. was passed through the jacket of the mill and the mill was vibrated at a frequency of 1500 oscillations per minute and an amplitude of 2 mm. Four kilogrammes of essentially anhydrous magnesium chloride (BDH technical grade) were introduced into the mill whilst the mill was being vibrated. After the addition of the magnesium chloride, the mill was vibrated for about 15 minutes and 2 dm³ of ethyl benzoate were added to the vibrating mill over a period of about 15 minutes. The mill was then vibrated for a further 24 hours whilst continuing to pass the mixture of water and ethylene glycol at 0° C. through the jacket of the mill.

After 24 hours, the mill was inverted, the inverted mill was vibrated and the milled magnesium chloride-ethyl benzoate was collected under nitrogen. The molar ratio of magnesium chloride to ethyl benzoate in the mill was about 3 to 1.

(B) Dispersion of milled magnesium chloride-ethyl benzoate

A one dm³ three-necked glass flask having a heating-/cooling jacket, was fitted with a high shear homogeniser of the Ultra Turrax T45 type (available from Janke and Kunkel KG IKA Werke). Into the flask were introduced 630 g of nitrogen sparged toluene, 245 g of the milled material obtained in stage (A) and 1.62 g of polystyrene ("Lustrex" HF 66-available from Monsanto Limited). Water at ambient temperature was passed through the heating/cooling jacket. The mixture was then subjected simultaneously to vigorous agitation and shearing by operating the homogeniser for five minutes at maximum power (an initial rate of stirring of 10,000 rpm). During the agitation and shearing, the temperature of the mixture rose but did not exceed 50° C.

The dispersion was then transferred to a storage vessel (a 2 dm³ three-necked glass flask fitted with a stirrer) and, whilst stirring, a further 0.8 g of polystyrene was added. The mixture was stirred for a further 30 minutes.

(C) Spray-drying of magnesium chloride-ethyl benzoate dispersion

The dispersion obtained in stage (B) was spray-dried using a glass laboratory scale spray-drying apparatus similar to that illustrated in FIG. 1 of the drawings and previously described herein. The spray-drying apparatus had a diameter of 15 cm and a length of 0.7 meters, the conical section 3 was replaced by a generally hemispherical bottom section, the conduit 12 was omitted, the valve 14 in the conduit 13 was omitted and the conduit 13 was connected directly to a cyclone provided with a catch-pot in which the solid material was collected. The spray nozzle used was a ¼ JAU Automatic Air Atomizing Nozzle obtained from Spraying Systems Co. of the USA and having a 0.52 mm diameter nozzle.

Spraying was effected under nitrogen by passing a stream of nitrogen, preheated to a temperature of 130° C., through conduit 11 at a rate of 190 dm³/minute. Nitrogen at a pressure of about 0.5 kg/cm² gauge was introduced into the spray nozzle through conduit 8. The suspension obtained in stage (B) was fed from the 2 dm³ three-necked glass flask to the spray nozzle by the application of an excess nitrogen pressure of 0.07 kg/cm² to this flask.

(D) Contacting with titanium tetrachloride 100 grammes of the spray-dried product from stage C were transferred to a two dm³ jacketted glass vessel which was provided with a stirrer. One dm³ of titanium tetrachloride were added to the vessel, the stirrer was started and heating was applied to the jacket. Heating was continued until a temperature of 100° C. was attained, which took 0.5 hours. The temperature was maintained at 100° C., and stirring was continued, for three hours. At the end of three hours, the stirrer was stopped and the solid was allowed to settle whilst continuing to heat the contents of the vessel. Two hours after terminating the stirring, the supernatant liquid was siphoned off from the settled solid. The heating was switched off and the contents of the vessel allowed to cool by standing overnight.

The contacting with the titanium tetrachloride was repeated by adding one dm³ of titanium tetrachloride to the cold residue remaining from the previous contacting, the conditions of treatment being as previously described.

(E) Washing

To the residue remaining from stage (D) was added 1.5 dm³ of a heptane fraction, at least 90% of which is n-heptane (hereafter referred to as the "n-heptane fraction") at ambient temperature. The mixture was stirred and heated up to reflux temperature (about 100° C.). Stirring at reflux temperature was continued for an hour and then ceased. After a further 30 minutes, the supernatant liquid was siphoned off from the settled solid whilst still heating.

After ten minutes, a further 1.5 dm³ of the n-heptane fraction at ambient temperature was added to the hot residue and the mixture was heated up to 100° C. and was stirred at that temperature for one hour. The stirrer was switched off and the solid allowed to settle. After one hour, the supernatant liquid was siphoned off from the settled solid. The heater was switched off and the settled solid allowed to cool overnight.

To the residue remaining from the previous washing step was added one dm³ of the n-heptane fraction at ambient temperature. The mixture was stirred for 15 minutes without heating and allowed to settle. After 35 minutes the supernatant liquid was siphoned off from the settled solid. This procedure was repeated once.

The cold residue remaining from the fourth washing step was diluted with the n-heptane fraction to give a final volume of one dm³ and the mixture was transferred to a storage vessel under nitrogen.

A sample (5 cm³) of the mixture was treated with 2N sulphuric acid and the aqueous layer was subjected to spectrophotometric analysis. The mixture was found to contain 2.7 milligramme atoms of titanium/dm³, 72 milligramme atoms of magnesium and 160 milligramme atoms of chloride/dm³. The solid component had a titanium content of 1.64% by weight.

EXAMPLE 2

(A) Milling magnesium chloride and ethyl benzoate

A Siebtechnik SM 6 Vibromill chamber having a total usable volume of about 1.5 dm³ and containing 180 stainless steel balls of 25 mm diameter was sealed, evacuated to a pressure of $0.3 \times 10^{-3}$ kg/cm$^2$ and purged with nitrogen to give a nitrogen atmosphere in the mill. A mixture of water and ethylene glycol at 0° C. was passed through the jacket of the mill and the mill was vibrated at a frequency of 1500 oscillations per minute and an amplitude of 2 mm. 182 grammes of essentially anhydrous magnesium chloride (BDH technical grade) was incorporated into the mill chamber whilst the mill was being vibrated. After the addition of the magnesium chloride, the mill was vibrated for about 15 minutes and 91 cm$^3$ of ethyl benzoate was then added to the vibrating mill over a period of about 5 minutes. The mill was then vibrated for a further 24 hours whilst continuing to pass the mixture of water and ethylene glycol at 0° C. through the jacket of the mill.

(B) Milling with toluene

After 24 hours, 500 cm$^3$ of toluene were added to the mill chamber whilst continuing to vibrate the mill. Milling was continued in the presence of the added toluene at 0° C. for a further three hours.

After three hours, the mill was inverted, the inverted mill was vibrated and the milled magnesium chloride-ethyl benzoate was collected under nitrogen. The mill chamber was washed out with 800 cm$^3$ of toluene which was added to the suspension previously removed. The molar ratio of magnesium chloride to ethyl benzoate in the mill was about 3 to 1.

To the milled mixture, which was being stirred, was added a 10% weight/volume solution of polystyrene ("Styron" 686/7-available from Dow Chemical Company) in toluene to provide 2% by weight of polystyrene relative to the milled magnesium chloride—ethyl benzoate.

After standing overnight, the mixture had set solid and it was necessary to add a further quantity of toluene, and to agitate the mixture, in order to resuspend the solid particles. The diluted mixture had a solid content of about 15% by weight.

(C) Spray drying magnesium chloride/ethyl benzoate suspension

All of the suspension obtained in step (B) was spray-dried using a glass laboratory scale spray drying apparatus similar to that illustrated in FIG. 1 of the drawings and previously described herein. The spray drying apparatus had a diameter of 15 cm and a length of 0.7 meters, the conical section 3 was replaced by a generally hemispherical bottom section, the conduit 12 was omitted, the valve 14 in the conduit 13 was omitted and the conduit 13 was connected directly to a cyclone provided with a catch-pot in which the solid material was collected. The spray nozzle used was a ¼ JAU Automatic Air Atomizing Nozzle obtained from Spraying Systems Co. of the USA and having a 0.72 mm diameter nozzle.

Spraying was effected under nitrogen by passing a stream of nitrogen, preheated to a temperature of 140° to 150° C., through conduit 11 at a rate of 170 to 180 dm$^3$/minute. Nitrogen at a pressure of about 1.4 kg/cm$^2$ absolute was introduced into the spray nozzle. The suspension obtained in step (B) was fed from a stirred storage flask of the spray nozzle by the application of an excess nitrogen pressure of 0.25 kg/cm$^2$ to the storage flask.

(D) Contacting with titanium tetrachloride

A sample (96 grammes) of the spray dried product from stage (C) was transferred to a 1.8 dm$^3$ jacketted glass vessel which was provided with a stirrer. One dm$^3$ of titanium tetrachloride was added to the vessel, the stirrer was started and heating was applied to the jacket. Heating was continued until a temperature of 100° C. was attained, which took 0.5 hours. The temperature was maintained at 100° C., and stirring was continued, for three hours. At the end of three hours, the stirrer was stopped and the solid was allowed to settle whilst continuing to heat the contents of the vessel. 4.0 hours after terminating the stirring, the supernatant liquid was siphoned off from the settled solid. The heating was switched off and the contents of the vessel allowed to cool by standing overnight.

The contacting with the titanium tetrachloride was repeated by adding one dm$^3$ of titanium tetrachloride to the cold residue remaining from the previous contacting, the conditions of treatment being as previously described.

(E) Washing

To the residue remaining from stage (D) was added a sufficient quantity of the n-heptane fraction, at ambient temperature to give at total volume of 1.5 dm$^3$. The mixture was stirred and heated up to reflux temperature (about 100° C.). Stirring at reflux temperature was continued for an hour and then ceased. After a further 2.5 hours, the supernatant liquid was siphoned off from the settled solid whilst still heating.

Heating was ceased and a sufficient quantity of the n-heptane fraction at ambient temperature was added to the hot residue to give a total volume of 1.5 dm$^3$ at a temperature of about 45° C. The mixture was stirred without heating for 15 minutes. The stirrer was switched off and the solid allowed to settle. After 1.25 hours, the supernatant liquid was siphoned off from the settled solid.

To the residue remaining from the previous washing step was added a sufficient quantity of the n-heptane fraction at ambient temperature to give a total volume of 1.5 dm$^3$ at ambient temperature. The mixture was stirred for 15 minutes without heating and allowed to settle. After 1.25 hours, the supernatant liquid was siphoned off from the settled solid.

The cold residue remaining from the third washing step was diluted with the n-heptane fraction to give a final volume of 1.0 dm$^3$ and the mixture was transferred to a storage vessel under nitrogen.

EXAMPLE 3

The procedure of Example 2 was repeated with the changes noted hereafter.

In stage (A), 255 grammes of magnesium chloride and 32 cm$^3$ of ethyl benzoate were used. The molar ratio of magnesium chloride to ethyl benzoate was about 12 to 1.

In stage (B), 400 cm$^3$ of toluene were used and the mixture was milled for 0.5 hours. The mill chamber was washed out with 300 cm$^3$ of toluene. The mixture was allowed to stand overnight, without adding any polystyrene, and the mixture was still fluid the following morning. The polystyrene solution was added, whilst stirring the mixture, to provide 1.5% by weight of polystyrene relative to the milled magnesium chloride-ethyl benzoate.

In stage (C), the heated nitrogen was passed at a rate of 190 dm$^3$/minute. Nitrogen at a pressure of about 1.25 kg/cm$^2$ absolute was introduced into the spray nozzle. The excess pressure applied to the storage flask was 0.14 kg/cm$^2$.

In stage (D), an 800 cm$^3$ jacketted glass vessel with a stirrer was used. 25.5 grammes of the spray-dried product from stage (C) were used and 255 cm$^3$ of titanium tetrachloride for each treatment with titanium tetrachloride. At the end of the second treatment with titanium tetrachloride, the solid was allowed to settle for 1.5 hours, the supernatant liquid was removed but the mixture was not allowed to cool.

In stage (E), four washing steps were effected and each washing step was effected using 300 cm$^3$ of an aliphatic hydrocarbon consisting essentially of dodecane isomers and having a boiling point in the range 170° C. to 185° C. (hereafter referred to simply as the "aliphatic hydrocarbon"). The first and second washes were effected by heating the mixture up to 100° C. and stirring at this temperature for one hour. The first wash was effected by adding the aliphatic hydrocarbon to the hot residue remaining after the second treatment with titanium tetrachloride. The second wash was effected by adding the aliphatic hydrocarbon to the hot residue remaining after the first wash. Heating was terminated after the second wash and the third wash was effected by adding the aliphatic hydrocarbon to the hot residue from the second was and stirring for 15 minutes without heating. After removing the supernatant liquid from the third wash, the mixture was allowed to cool overnight and the fourth was effected on the cold residue of the third wash. The residue was diluted to give a final volume of 255 cm$^3$ using the aliphatic hydrocarbon.

EXAMPLE 4

The procedure of Example 3 was repeated with the changes noted hereafter.

In stage (A), 207 grammes of magnesium chloride and 52 cm$^3$ of ethyl benzoate were used. The molar ratio of magnesium chloride to ethyl benzoate was about 6 to 1.

In stage (B), the mill chamber was washed out with 200 cm$^3$ of toluene. After standing overnight, the mixture was still fluid but was viscous. After adding the polystyrene solution, a further 100 cm$^3$ of toluene were added.

In stage (C), nitrogen at a pressure of about 1.35 kg/cm$^2$ absolute was introduced into the spray nozzle.

In stage (D), 25 grammes of the spray-dried product from stage (C) were used and 250 cm$^3$ of titanium tetrachloride for each treatment with titanium tetrachloride. In each titanium tetrachloride treatment, the solid was allowed to settle for about one hour before the supernatant liquid was siphoned off.

In stage (E), the washings were effected using the n-heptane fraction. The residue was allowed to cool overnight after the first hot wash. The second hot wash was effected and the two cold washes were effected in succession directly after the second hot wash. The residue was diluted to give a final volume of 250 cm$^3$ using the n-heptane fraction.

EXAMPLE 5

The procedure of Example 4 was repeated with the changes noted hereafter.

In stage (A), 212.4 grammes of magnesium chloride, 53.5 cm$^3$ of ethyl benzoate and 53.5 cm$^3$ of toluene were used. The molar ratio of magnesium chloride to ethyl benzoate was about 6 to 1.

In stage (B), the mill chamber was washed out with 300 cm$^3$ of toluene. The total suspension was split into two approximately equal portions. To one portion of the suspension was added the polystyrene solution to provide 2% by weight of polystyrene relative to the milled magnesium chloride-ethyl benzoate. The suspension was diluted with a sufficient quantity of toluene to give a final suspension having a 25% by weight solid content.

In stage (C), nitrogen at a pressure of about 1.42 kg/cm$^2$ absolute was introduced into the spray nozzle and the excess pressure applied to the storage flask was 0.22 to 0.25 kg/cm$^2$. The spray nozzle was located at the bottom of the spray drying apparatus and the hot nitrogen was introduced into the top of the spray drying apparatus so that the spraying was in an upward direction against a counter-current of hot nitrogen.

In stage (D), 30 grammes of the spray-dried product from stage (C) were used and 300 cm$^3$ of titanium tetrachloride for each treatment with titanium tetrachloride.

In stage (E), washing was effected using 350 cm$^3$ of the aliphatic hydrocarbon for each wash. The residue was not allowed to cool after the first hot wash, the second hot was was effected directly after the first hot wash and the residue was allowed to cool overnight after the second hot wash. The cold washes were carried out on the cold residue of the second hot wash. The residue was diluted to a final volume of 300 cm$^3$ using the aliphatic hydrocarbon.

EXAMPLE 6

The remaining portion of the milled suspension obtained in stage (B) of Example 5 was used. To this remaining portion was added a 10% weight/volume situation in toluene of polymethylmethacrylate (MH 254 grade-available from Imperial Chemical Industries PLC). The polymethylmethacrylate solution was added to provide 2.0% by weight of polymethylmethacrylate relative to the milled magnesium chloride-ethyl benzoate. This suspension was diluted with toluene to give a final suspension having a 25% by weight solid content.

The suspension obtained was then spray-dried, treated with titanium tetrachloride, washed and diluted as in stages (C), (D) and (E) of Example 5.

EXAMPLES 7 TO 13

Polymerisation was carried out in an 8 dm$^3$ stainless steel autoclave.

3 dm$^3$ of the aliphatic hydrocarbon were charged into the autoclave and degassed at 70° C. for 15 minutes at a pressure of 50 millimeters of mercury. Propylene was then admitted to the vessel in an amount to give a pressure of 1.1 kg/cm$^2$ absolute. The aliphatic hydrocarbon was stirred and stirring was continued throughout the following procedures. 20 millimole of aluminium tri-isobutyl were added to the autoclave as a 25% by weight solution in the aliphatic hydrocarbon. 7 millimoles of methyl p-methylbenzoate were then added to the autoclave as a solution in the aliphatic hydrocarbon. A quantity of a suspension of a spray-dried magnesium chloride supported titanium halide composition obtained in one of Examples 1 to 6 was then added.

The autoclave was maintained at 70° C. while propylene was passed into the autoclave to achieve a pressure of 11.5 kg/cm$^2$ absolute. 10 millimoles of hydrogen were then added. The pressure was maintained at 11.5 kg/cm² absolute by feeding propylene. After 0.5 hour, and again after one hour, further 10 millimole quantities of hydrogen were added to the autoclave. After 2 hours, the propylene feed was terminated and the autoclave was vented to atmospheric pressure. The polymer suspension was passed into a receptacle and the polymer was filtered off in air. A sample of the polymer was dried at 100° C. in a fluidised bed using nitrogen as the fluidising gas.

Further details of the polymerisation conditions, and the properties of the products obtained, are given in Table One.

TABLE One

| Ex (a) | Ti Compn. Type (b) | Ti Compn. Amount (cm³) (c) | MFI (d) | FM (e) | Ti (f) | Al (f) | Cl (f) | (g/l) (h) |
|---|---|---|---|---|---|---|---|---|
| 7* | 1 | 0.058* | 25.5 | 1.47 | 5 | 197 | 186 | ND |
| 8 | 2 | 3 | 10.4 | 1.45 | 9 | 457 | 280 | 339 |
| 9** | 3 | 4 | 23.0 | 1.42 | 9 | 293 | 220 | ND |
| 10 | 4 | 4 | 7.0 | 1.43 | 5 | 285 | 195 | 390 |
| 11 | 5 | 4 | 17.7 | 1.60 | ND | ND | ND | 404 |
| 12 | 5 | 4 | 23.1 | 1.51 | ND | ND | ND | ND |
| 13 | 6 | 4 | ND | 1.56 | ND | ND | ND | 422 |

Notes to Table One
(a)* In this polymerisation, the pressure was maintained at 10 kg/cm² absolute.
**In this polymerisation, the pressure was maintained at 12.2 kg/cm² absolute.
(b) Type refers to the Example in which the production of the titanium composition is described.
(c) Amount is the volume of suspension added.
*Amount is the number of millimoles of titanium present in the added solid.
(d) MFI is melt flow index measured by ASTM Test Method D 1238/70, Condition N (190° C. and 10 kg).
(e) FM is the flexural modulus expressed in GN/m². The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip, which had dimensions of approximately 150 × 19 × 1.6 mm, was prepared in the following manner.
23 g of the polymer were mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil and pressed by means of an electric Tangye press at a temperature of 250° C. The pressing was pre-heated for a period of 6 minutes, under just enough pressure to make the polymer flow across the template, that is an applied force of about 1 tonne. After the pre-heat period, the applied force was raised to 15 tonnes in 5 tonne increments, degassing (that is releasing pressure) every 5 tonnes. After 2 minutes at 15 tonnes, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C. and after 2 hours at this temperature the heat was switched off and the oven cooled to ambient temperature at 15° C. per hour.
(f) The titanium (Ti), aluminium (Al) and chlorine (Cl) residues from the catalyst are given in parts per million by weight relative to the total polymer product (polymer + catalyst residues) and were measured by X-ray fluorescence on compression moulded discs.
(h) PD is the packing density which is determined by introducing 10 grammes of the polymer powder into a 50 cm³ flat-bottomed graduated tube of 2 cm internal diameter. The polymer powder is compacted by striking the base of the tube against a horizontal surface a total of 30 times. The volume occupied by the polymer powder was then determined. Duplicate measurements are made. ND means that this property was not determined for the polymer.

Some of the polymer products were subjected to particle size analysis by sieving and the results are set out in Table Two.

TABLE Two

| Particle size (microns) | % Weight retained Example 8 | Example 11 | Example 13 |
|---|---|---|---|
| >850 | 1.8 | 8.1 | 4.8 |
| 850–500 | 9.6 | 28.3 | 21.6 |
| 500–425 | 4.7 | 9.9 | 9.2 |
| 425–300 | 13.5 | 20.7 | 21.7 |
| 300–212 | 11.9 | 11.1 | 14.1 |
| 212–125 | 15.6 | 10.0 | 13.7 |
| 125–75 | 20.2 | 6.2 | 8.4 |
| <75 | 22.8 | 5.7 | 6.4 |

In Examples 14, 15, 17 and 19, the spray-drying of a magnesium chloride support in accordance with the present invention was incorporated into the procedure of our copending patent application Ser. No. 444,364 entitled "Composition, Production and Use", which includes a treatment with a non-metallic halide, such as thionyl chloride. In all of Examples 14 to 20, a suspension of magnesium chloride in a hydrocarbon liquid was subjected to mechnical action in accordance with the procedure of our copending application Ser. No. 405,983, of even date herewith, entitled "Spraying Solid".

EXAMPLE 14

(A) Milling magnesium chloride, thionyl chloride and ethyl benzoate Milling was effected in a Siebtechnik SM6 Vibromill chamber as used in stage (A) of Example 2.

180.5 grammes of essentially anhydrous magnesium chloride (BDH technical grade) and 6.6 cm³ of thionyl chloride were introduced into the mill chamber. The mill chamber was then placed in the mill assembly, water at ambient temperature was passed through the jacket of the mill chamber, and the mill assembly was vibrated at a frequency of 1500 oscillations per minute and an amplitude of 2 mm. The vibration was continued for two hours whilst continuing to pass water at ambient temperature through the jacket of mill chamber. The mill chamber was cooled over a period of 1.25 hours by passing a mixture of water and ethylene glycol at −12° C. through the jacket of the mill chamber whilst continuing to vibrate the mill assembly. Vibration of the mill assembly was stopped, 45.5 cm³ of ethyl benzoate were introduced into the mill assembly, vibration was restarted and continued for 24 hours. The molar ratio of magnesium chloride to ethyl benzoate in the mill chamber was about 6 to 1.

(B) Milling with toluene

After 24 hours, 400 cm³ of toluene were added to the mill chamber whilst continuing to vibrate the mill. Milling was continued in the presence of the added toluene at 0° C. for a further 30 minutes.

After 30 minutes, the mill was inverted, the inverted mill was vibrated and the mixture of the milled solid and toluene was collected under nitrogen. The mill chamber was washed out with a further 300 cm³ of toluene, which was added to the suspension previously removed.

After standing for 65 hours, the milled mixture was still fluid but was viscous. The mixture was stirred and 39 cm³ of a 10% weight/volume solution of polystyrene ('Styron' 686/7-available from Dow Chemical Company) in toluene was added to provide 2.0% by weight of polystyrene relative to the milled solid. This mixture had a solid content of 24% by weight.

(C) Spray drying milled solid/toluene mixture

All of dispersion obtained in stage (B) was spray-dried using the glass laboratory scale spray-drying apparatus used in stage (C) of Example 1.

Spraying was effected under nitrogen by passing a stream of nitrogen, preheated to a temperature of 145° C., into the spray-drying apparatus at a rate of 190 dm³/minute. Nitrogen at a pressure of about 0.4 kg/cm² gauge was introduced into the spray nozzle. The suspension obtained in stage (B) was fed from the 2 dm³ three-necked glass flask to the spray nozzle by the application of an excess nitrogen pressure of 0.04 kg/cm² to this flask.

(D) Contacting with titanium tetrachloride

A sample (39 grammes) of the spray dried product from stage (C) was transferred to a 800 cm³ jacketted glass vessel which was provided with a stirrer. 390 cm³ of titanium tetrachloride were added to the vessel, the stirrer was started and heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. 50 minutes after terminating the stirring, the supernatant liquid was siphoned off from the settled solid. The heating was switched off and the contents of the vessel allowed to cool by standing overnight.

(E) Washing

To the residue remaining from stage (D) were added 450 cm³ of the aliphatic hydrocarbon at ambient temperature The mixture was stirred and heated up to a temperature of 100° C. Stirring at 100° C. was continued for an hour and then ceased. After a further 75 minutes, the supernatant liquid was siphoned off from the settled solid whilst still heating. The heating was switched off and 450 cm³ of the aliphatic hydrocarbon at ambient temperature were added to the hot residue. The mixture was stirred without heating for 15 minutes, then the stirrer was switched off and the solid allowed to settle. After one hour, the supernatant liquid was siphoned off from the settled solid. This washing procedure was repeated twice more.

The cold residue remaining from the fourth washing step was diluted with the aliphatic hydrocarbon to give a final volume of 390 cm³ and the mixture was transferred to a storage vessel under nitrogen.

EXAMPLE 15

(A) Milling magnesium chloride and ethyl benzoate

A siebtechnik SM50 Vibromill having a total volume of about 165 liters and containing 570 kg of steel balls of 25 mm diameter was purged thoroughly with nitrogen to give a nitrogen atmosphere in the mill. 16 kilogrammes of anhydrous magnesium chloride (as used in Example 1) were introduced into the mill which was cooled to −10° C. by passing a mixture of water and ethylene glycol at about −20° C. through the jacket of the mill.

Once the desired temperature had been achieved, the mill was vibrated using a frequency of 1500 oscillations per minute and an amplitude of 2 mm, whilst continuing to pass the mixture of water and ethylene glycol at −20° C. through the jacket of the mill.

4 dm³ of ethyl benzoate was added to the vibrating mill over a period of 2.25 hours, during which time the temperature rose to about 20° C. Milling was continued, whilst still cooling the mill, for a total milling time of 24 hours. The molar ratio of magnesium chloride to ethyl benzoate in the mill was about 6 to 1.

(B) Milling with toluene

Without removing the milled magnesium chloride-ethyl benzoate product of stage (A), 25 dm³ of toluene and 4 dm³ of a 10% weight/volume solution of polystyrene in toluene (as used in stage B) of Example 14) were added to the vibrating mill. Milling was continued, whilst cooling, for a further 30 minutes and the magnesium chloride suspension produced was transferred, under nitrogen, into a drum of capacity 100 dm³.

25 dm³ of toluene were added to the mill, milling was effected for 20 minutes and the liquid, together with any residual magnesium chloride, was transferred to the drum.

(C) Spray drying milled solid/toluene mixture

The contents of the drum obtained as described in stage (B), were spray dried using spray-drying apparatus essentially as described with reference to FIG. 2. The spray-drying vessel had a diameter of 2.2 m, a cylindrical height of 1.95 m and a 60° cone.

The circulating gas was nitrogen which was pre-heated to about 140° C. before entering the spray-drying vessel. The rate of supply of nitrogen was about 650 kg per hour.

The suspension was not pre-heated and hence was at ambient temperature on being fed to the spray-drying vessel.

The rate of rotation of the atomizer disc was 18000 rpm and the time during which the suspension was fed to the spray-drying vessel was 20 minutes.

(D) Contacting with thionyl chloride

A sample (16 grammes) of the spray dried product from stage (C) was transferred to a 800 cm³ jacketted glass vessel which was provided with a stirrer. 160 cm³ of the aliphatic hydrocarbon and 0.4 cm³ of thionyl chloride were added to the vessel, the stirrer was started and heating was applied to the jacket. Heating was continued until a temperature of 50° C. was attained. The temperature was maintained at 50° C., and stirring was continued, for one hour. At the end of one hour, the stirrer was stopped and the solid was allowed to settle whilst continuing to heat the contents of the vessel. Ten minutes after terminating the stirring, the supernatant liquid was siphoned off from the settled solid.

(E) Contacting with titanium tetrachloride

To the hot residue from stage (D) were added 160 cm³ of titanium tetrachloride. The stirrer was started and heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. 40 minutes after terminating the stirring, the supernatant liquid was siphoned off from the settled solid. The heating was switched off and the contents of the vessel allowed to cool by standing overnight.

The treatment with titanium tetrachloride was repeated with the exception that the solid was allowed to settle for 45 minutes before the supernatant liquid was siphoned off and the residue was not allowed to cool.

(F) Washing

To the hot residue remaining from stage (E) were added 200 cm³ of the aliphatic hydrocarbon at ambient temperature. The mixture was stirred and heating was continued to raise the temperature to 100° C. Stirring at 100° C. was continued for an hour and then ceased.

After a further 25 minutes, the supernatant liquid was siphoned off from the settled solid whilst still heating. The heating was switched off and 200 cm³ of the aliphatic hydrocarbon at ambient temperature were added to the hot residue. The mixture was stirred without heating for 10 minutes, then the stirrer was switched off and the solid allowed to settle. After one hour, the supernatant liquid was siphoned off from the settled solid. This washing procedure was repeated twice more.

The cold residue remaining from the fourth washing step was diluted with the aliphatic hydrocarbon to give a final volume of 160 cm³ and the mixture was transferred to a storage vessel under nitrogen.

EXAMPLE 16

The spray dried product of stage (C) of Example 15 was used and was subsequently treated in a similar manner to that described for stages (D) and (E) of Example 14. This material was not contacted with thionyl chloride.

(D) Contacting with titanium tetrachloride

The procedure of stage (D) of Example 14 was repeated using 27 grammes of the spray dried product of stage (C) of Example 15 and 270 cm³ of titanium tetrachloride. The solid was allowed to settle for 15 minutes and the supernatant liquid was siphoned off but the residue was not allowed to cool.

(E) Washing

The procedure was essentially as described in stage (E) of Example 14 with the exception that the hot residue from stage (D) was used and 300 cm³ of the aliphatic hydrocarbon were used for each wash. After the second wash, the solid was allowed to cool and settle for about 65 hours.

After the fourth wash, the residue was diluted to a volume of 270 cm³.

EXAMPLE 17

A sample of the spray dried product of stage (C) of Example 15 was treated as generally described in stages (D), (E) and (F) of Example 15, but on a larger scale.

(D) Contacting with thionyl chloride

This was effected in a vessel of 6 dm³ capacity. 500 grammes of the spray dried product of stage (C) of Example 15, 5 dm³ of the aliphatic hydrocarbon and 13 cm³ of thionyl chloride were used. The supernatant liquid was siphoned off 80 minutes after terminating the stirring.

(E) Contacting with titanium tetrachloride

This was effected in the same vessel as stage (D), using 3 dm³ of titanium tetrachloride for each contacting and maintaining the temperature at 100° C. for two hours. After the first contacting the solid was allowed to settle for one hour and after the second contacting the settling time was 1.5 hours.

(F) Washing

To the hot residue from stage (E) were added 5.5 dm³ of the aliphatic hydrocarbon and the mixture was allowed to stand, without heating, for 18 hours. The mixture was then stirred and heated to 100° C., maintained at 100° C. for one hour, allowed to settle for 10 minutes and the supernatant liquid was siphoned off. Heating was stopped and the three subsequent washes were effected using 5.5 dm³ of the aliphatic hydrocarbon for each wash. The residue was finally diluted to a total volume of 4.5 dm³.

EXAMPLE 18

The procedure was similar to that of Example 17 with the exception that stages (D), (E) & (F) were effected using smaller quantities of reagents and omitting thionyl chloride in stage (D).

(D) Contacting with the aliphatic hydrocarbon 200 grammes of the spray dried product of stage (C) of Example 15 and 2 dm³ of the aliphatic hydrocarbon were used. The supernatant liquid was siphoned off 35 minutes after terminating the stirring.

(E) Contacting with titanium tetrachloride 1.5 dm³ of titanium tetrachloride were used for the first contacting, and the solid was allowed to settle for 1.75 hours. Two dm³ of titanium tetrachloride were added to the residue and the mixture was allowed to stand, without heating, for 18 hours. The mixture was stirred, heated to 100° C., maintained at 100° C. for three hours and allowed to settle for one hour 20 minutes.

(F) Washing

Two dm³ of the aliphatic hydrocarbon were used for each wash. The aliphatic hydrocarbon was added to the hot residue from stage (E) and the temperature was raised to 100° C. After an hour at 100° C., the solid was allowed to settle for 40 minutes. The subsequent three washes were effected without heating and the residue was diluted to a total volume of 2 dm³.

EXAMPLE 19

The procedure was similar to that of Example 17 with the exception that stages (D), (E) and (F) were effected using smaller quantities of reagents and only one contacting step in stage (E).

(D) Contacting with thionyl chloride 200 grammes of the spray dried product of Example 15, 2 dm³ of the aliphatic hydrocarbon and 5.2 cm³ of thionyl chloride were used.

(E) Contacting with titanium tetrachloride

Two dm³ of titanium tetrachloride were used for a single contacting at 100° C. for three hours.

(F) Washing

Washing was effected directly after the titanium tetrachloride contacting, using 2 dm³ of the aliphatic hydrocarbon for each wash.

EXAMPLE 20

The procedure was as described for Example 19 with the exception that stage (D) was omitted.

EXAMPLES 21 TO 28

Polymerisation was carried out in an 8 dm³ stainless steel autoclave in a manner generally as described for Examples 7 to 13 with the following variations. 40 cm³ of a solution in the aliphatic hydrocarbon containing 20 millimole of aluminium triisobutyl were added to the autoclave followed by 40 cm³ of a solution in the aliphatic hydrocarbon containing 7 millimoles of methyl p-methylbenzoate. 4 cm³ of a suspension of a titanium halide composition, obtained in one of Examples 14 to 20 were then added as a suspension. Some Properties of the polymers obtained are give in Table Three.

TABLE Three

| Example or Comp Example | Ti Compn Type (b) | Polymer Properties | | | | | |
|---|---|---|---|---|---|---|---|
| | | MFI (d) | FM (e) | Ti (f) | Al (f) | Cl (f) | PD (g/l) (h) |
| 21 | 14 | 21.0 | 1.50 | 7 | 152 | 196 | 421 |
| 22 | 15 | 37.3 | 1.53 | 6 | 152 | 210 | 408 |
| 23 | 16 | ND | 1.40 | 7 | 155 | ND | 408 |
| 24 | 17 | 31.5 | 1.42 | 8 | 134 | 177 | 408 |
| 25 | 17 | ND | 1.48 | 6 | 99 | 195 | 413 |
| 26 | 19 | 25.9 | 1.52 | 6 | 171 | 205 | 417 |
| 27 | 18 | 47.7 | 1.52 | 9 | 171 | 193 | 417 |
| 28 | 20 | 42.9 | 1.50 | 7 | 159 | 213 | 404 |

Notes to Table Three
(b), (d), (e), (f) and (h) are all as defined in Notes to Table One.

For each polymer, a sample of the filtered polymer was washed with 60–80 petroleum ether and dried in a vacuum oven for 4 hours at a pressure of 50 mm of mercury and a temperature of 60° C. The dried polymer was subjected to particle size analysis by sieving and the results are set out in Table Four.

TABLE Four

| Particle size (microns) | % Weight Retained | | | | | | | |
|---|---|---|---|---|---|---|---|---|
| | Ex 21 | Ex 22 | Ex 23 | Ex 24 | Ex 25 | Ex 26 | Ex 27 | Ex 28 |
| >850 | 2.9 | 1.6 | 0.5 | 2.5 | 1.2 | 1.2 | 0.9 | 0.8 |
| 850–500 | 17.9 | 28.2 | 18.6 | 39.5 | 33.9 | 30.9 | 21.6 | 22.5 |
| 500–425 | 7.1 | 13.1 | 12.3 | 16.3 | 16.5 | 16.2 | 12.6 | 12.7 |
| 425–300 | 15.7 | 24.4 | 24.8 | 28.5 | 29.1 | 27.6 | 23.1 | 25.1 |
| 300–212 | 9.9 | 13.0 | 14.0 | 9.4 | 13.2 | 13.4 | 12.7 | 13.5 |
| 212–125 | 11.4 | 11.1 | 13.5 | 2.9 | 4.9 | 8.2 | 12.1 | 12.5 |
| 125–75 | 11.9 | 5.4 | 9.9 | 0.8 | 1.0 | 2.1 | 8.0 | 7.5 |
| <75 | 23.2 | 3.3 | 7.5 | 0.1 | 0.3 | 0.4 | 9.0 | 5.5 |

I claim:

1. A process for the production of a polymer or copolymer of an unsaturated monomer wherein at least one ethylenically unsaturated hydrocarbon monomer is contacted, under polymerisation conditions, with a polymerisation catalyst which is the product obtained by mixing together
   (1) A transition metal composition; and
   (2) an organic compound of aluminium or of a metal of Group IIA of the Periodic Table or a complex of an organic compound of a metal of Group IA or Group IIA of the Periodic Table together with an organic aluminium compound,
   wherein the transition metal composition which is component, (1) of the polymerisation catalyst is the product obtained by a process in which a solid support material which is a metal halide is suspended in a liquid medium which is a liquid hydrocarbon or a liquid halohydrocarbon, the suspension is spray-dried, the spray-dried support material is collected and the collected spray-dried support material is contacted with at least one compound of a transition metal of Group IVA, VA, or VIA of the Periodic Table.

2. The process of claim 1 wherein the polymerisation catalyst also inclues a Lewis Base compound.

3. The process of claim 1 wherein propylene is polymerised in the gas phase.

4. The process of claim 1 wherein component (1) of the polymerisation catalyst is the product obtained by a process in which the metal halide which is the solid support material is a magnesium halide.

5. The process of claim 4 wherein component (1) of the polymerisation catalyst is the product obtained by a process in which the metal halide which is the solid support material is a magnesium chloride which has been contacted with an ester of a carboxylic acid containing an aromatic group.

6. The process of claim 1 wherein component (1) of the polymerisation catalyst is the product obtained by a process in which the suspension is spray-dried by passing the suspension through an atomizer to form a spray of droplets, contacting the droplets with a stream of a gas which is essentially oxygen- and water vapour-free and is at a temperature of at least 80° C., evaporating liquid medium from the droplets and collecting a separated solid product.

7. The process of claim 1 where component (1) of the polymerisation catalyst is the product obtained by a process in which the suspension which is spray-dried also contains an attrition inhibitor to which renders the spray-dried solid more resistant to attrition.

8. The process of claim 7 wherein component (1) of the polymerisation catalyst is the product obtained by a process in which the suspension contains the attrition inhibitor in an amount of from 0.5% up to 10% by weight of the attrition inhibitor relative to the solid support material present in the suspension.

9. The process of claim 1 wherein component (1) of the polymerisation catalyst is the product obtained by a process in which, after spray-drying, the collected spray-dried solid support material is subject to at least one contacting step with titanium tetrachloride.

* * * * *